Aug. 17, 1965 J. D. HANULEC ETAL 3,201,705

INTEGRATOR FOR PERIODICALLY RECURRING SIGNALS

Filed April 28, 1961 3 Sheets-Sheet 1

INTEGRATOR FOR PERIODICALLY RECURRING SIGNALS

Filed April 28, 1961 3 Sheets-Sheet 2

3,201,705
INTEGRATOR FOR PERIODICALLY RECURRING SIGNALS

Joseph D. Hanulec, Woodbury, and Carl E. Schwab, Farmingdale, N.Y., assignors to Hazeltine Research, Inc., a corporation of Illinois Filed Apr. 28, 1961, Ser. No. 106,332
8 Claims. (Cl. 328—165)

This invention is concerned with an integrator for improving the signal-to-noise ratio of periodically recurring signals.

While the invention has general application, it will be described with reference to a radar system, an environment in which it is particularly useful.

The term "integrator," as used here, refers to a device which additively combines synchronous information and rejects asynchronous information. Where, as in a radar system, the desired signal is synchronous (i.e. recurs with a fixed repetition period), an integrator effectively amplifies the synchronous information relative to any asynchronous information. The resulting improvement in signal-to-noise ratio makes it possible to detect signals (targets) which would otherwise be lost in noise.

The term "sample of the carrier signal" or simply "sample," as used here, refers to the carrier signal which was generated by an oscillator during one repetition period of the desired periodically recurring signal and which has been passed through the integrator at least one time.

In general, the signals received by a radar system cover a relatively wide frequency range and are classified as video signals. In order to additively combine the radar signals received during successive repetition periods, it is necessary to store or delay the received signals until later signals are received. This storage or delay is accomplished by passing the video signals through a delay line. Presently available delay lines would either destroy or seriously distort the video signals. Therefore, it is common practice to impress the video signals upon a radio-frequency carrier signal before they are passed through the delay line. The resulting modulated carrier signal is processed by the integrator and the integrated video signals are recovered by a demodulator.

Two types of video integrators which have been previously used are classified as FM and AM video integrators, depending upon the method used to impress the video signals upon the radio-frequency carrier signals. The FM system may be characterized as a "two-loop" system. That is, the video signals modulate the radio-frequency carrier and the modulated carrier is then circulated around an inner radio-frequency loop (signal path). This inner loop generally includes the modulator and a delay line which delays the modulated carrier for a period equal to the interval between successive radar signals. The delayed modulated carrier signal is fed back to the modulator and further modulated during each repetition period by successive video signals. The outer loop, which may be characterized as a degenerative video loop, includes a demodulator connected to the delay line for recovering the video signals, an attenuator for developing a signal which is a fraction of the delayed video signal and a combining device for subtracting this fraction of the delayed video signal from the next incoming video signal. The prior AM system may be characterized as a one-loop system. That is, the video signals amplitude modulate the radio-frequency carrier, the modulated carrier is delayed for a period equal to the interval between successive radar signals, the delayed video signal is recovered by an amplitude detector and a portion of the recovered video signal is attenuated and added to the next incoming video signal.

The outer degenerative loop in the FM integrator and the attenuator in the AM integrator serve the purpose of reducing the system loop gain to a value less than unity. That is, the integrator is a stable system. An improvement in signal-to-noise ratio is realized since the video signals produced at the demodulator progressively increase with respect to the undesired noise as successive radar signals are received and processed.

The AM and FM integrators which have previously been used have several undesirable characteristics. The components required for the degenerative video loop in such integrators must necessarily be broad bandwidth devices and are, therefore, costly and complex. In the AM system, the modulator and demodulator must be exceptionally linear and, an elaborate automatic-gain-control system is required to maintain a constant ratio between the integrator output signal and the fraction of the output signal which is fed back to the input. High feedback ratios (close to 1) cannot be used since slight variations in system gain would make the integrator unstable. The FM system is generally not subject to the shortcomings of the AM system enumerated above but suffers from serious disadvantages of another nature. Particularly, the FM integrator circuitry is substantially more complicated than that of the AM integrator because of the necessity of using several frequency mixers and extensive, elaborate filter networks to suppress undesired frequency products produced by the mixers.

It is an object of the present invention, therefore, to provide an arrangement which substantially avoids one or more of the limitations of the described prior arrangements.

It is a further object of the present invention to provide an integrator for periodically recurring signals which substantially improves the signal-to-noise ratio of such signals.

It is a further object of the present invention to provide an integrator for periodically recurring signals which is relatively simple to construct and reliable in operation.

In accordance with the invention an integrator for improving the signal-to-noise ratio of periodically recurring signals comprises means for supplying an unmodulated carrier signal; means for causing the recurring signals to periodically modulate the carrier signal so as to produce a cumulatively modulated carrier signal; the cumulative modulation thereof being detectable as an enhanced replica of the recurring signals; and means for adding the supplied unmodulated carrier signal to the cumulatively modulated carrier signal so as to degeneratively control the cumulative modulation.

For a better understanding of the present invention, together with other and further objects thereof, reference is had to the following description taken in connection with the accompanying drawings, and its scope will be pointed out in the appended claims.

Figure 1:
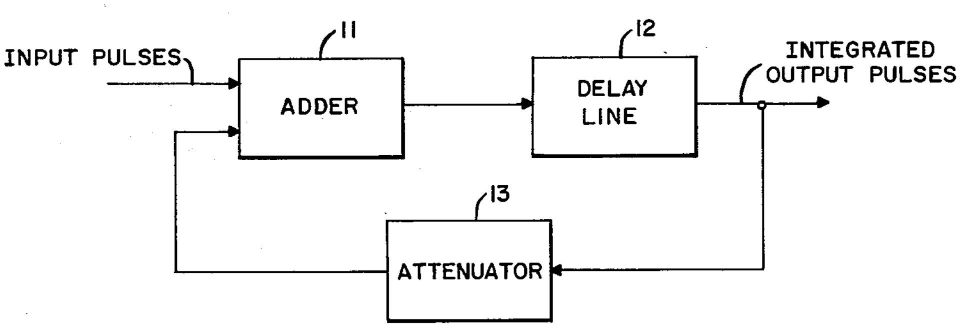
FIG. 1 is a block diagram of a simple, idealized integrator.

Referring now to FIG. 1, the operation of a simple idealized integrator will be explained as an aid to understanding the theory of operation of practical integrators. The simple integrator comprises an adder 11 which combines input pulses with a portion of the integrated output pulse; a delay line 12, which delays the pulses for a period equal to the reciprocal of the signal (pulse) repetition frequency (1/*PRF*); and an attenuator 13 for feeding back a portion of the output signal to the input of adder 11. The portion of the output signal which is fed back may be described $\alpha.E_0$ (where $E_0$ equals the intergrator voltage output and $\alpha<$).

In operation, a pulse of unity amplitude introduced into adder 11 is delayed for a period equal to 1/PRF by delay line 12 and multiplied by $\alpha$ in attenuator 13. The delayed pulse is returned to added 11 at the same instant as the next input signal pulse arrives. The two pulses are added and their sum is recirculated through delay line 12. The amplitude at the output of delay line 12 is then $1+\alpha$. This process continues until after N pulses are received the amplitude at the output is $$1+\alpha+\alpha^2+\alpha^3+ \dots \alpha^N$$

For a finite number of pulses the amplitude of the Nth pulse is $$\frac{1-\alpha^N}{1-\alpha}$$

Figure 2:
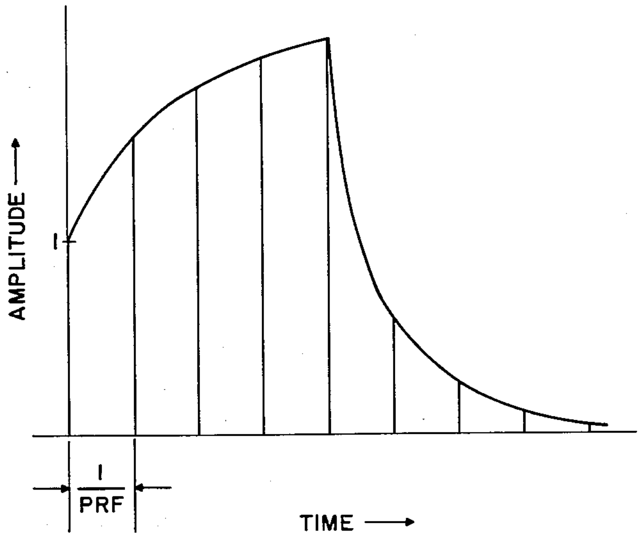
FIG. 2 is a graph showing the variation of the amplitude of the output signal from the simple integrator as a function of time.

When no new input pulses are received at adder 11 the circulating pulse continues to travel around the loop and is attenuated each circulation. The output decays exponentially as a function of $\alpha$. The buildup and decay of unit pulse inputs where $\alpha \approx 0.5$ are graphically shown in FIG. 2. It should be recognized that the amplitude of the integrated pulses will increase towards a greater limiting value where a larger $\alpha$ is used.

It has been shown that signals which recur at the desired pulse repetition frequency will add together and provide an increase in the signal output of the integrator. The increase in output depends upon both the number of successive signals which are integrated and the feedback ratio $\alpha$. Similarly, it is apparent that signals which recur with a PRF other than that determined by delay line 12 will not be integrated since a delayed pulse and the succeeding pulse of such a signal will not periodically appear simultaneously at the input of adder 11. It is also apparent that random signals (noise) will not, on the average, appear in the same phase at the input of adder 11 during successive pulse repetition periods. The ratio of signal-to-noise at the integrator output is, therefore, improved as successive signals are integrated up to a limit determined by the feedback ratio $\alpha$.

Figure 3:
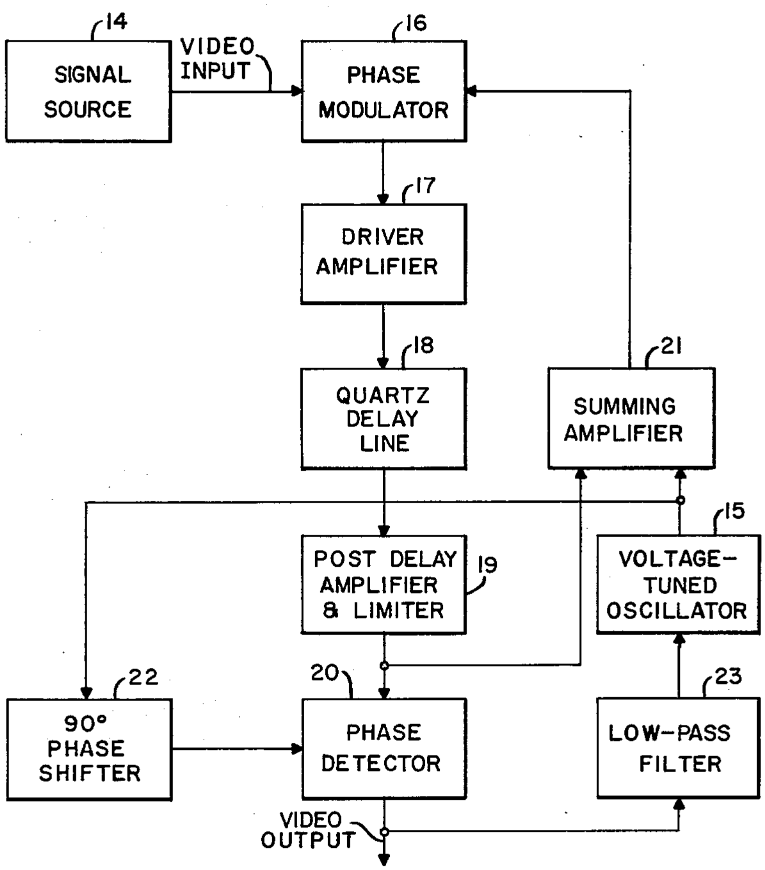
FIG. 3 is a bolck diagram of a phase modulation (PM) integrator embodying the present invention.

Referring now to FIG. 3 of the drawing, an integrator for periodically recurring signals embodying the invention comprises a source of input signals 14 such as a radar receiver. The input signals include desired signals which recur with a substantially fixed repetition period and undesired signals which do not recur with that fixed repetition period. The integrator further includes means for supplying a radio-frequency carrier signal which may, for example, be voltage-tuned oscillator 15. Voltage-tuned oscillator 15 may be of the type which utilizes the well-known reactance tube principles whereby the frequency of the carrier signal produced by voltage-tuned oscillator 15 may be varied by applying a correcting voltage in a manner which will be explained later. The integrator further includes a means for causing the recurring input signals to periodically vary a characteristic of a sample of the carrier signal during each repetition period. This last-mentioned means may, for example, include a means for varying the phase of a sample of the carrier signal with the recurring input signals, such as phase modulator 16. A driver amplifier 17 is coupled to the output of phase modulator 16 and the output of driver amplifier 17 is coupled to a means for delaying the modulated sample for a time interval equal to one repetition period of the recurring signal. This means for delaying the modulated sample may, for example, be quartz delay line 18. The output of quartz delay line 18 is coupled to post delay amplifier and limiter 19 which, in turn, is coupled to phase detector 20. The output of post delay amplifier and limiter 19 is also coupled to a means for returning the delayed sample to the phase-modulating means as the next recurring input signal is received so that successive desired signals produce a cumulative change of the phase of the sample. This means for returning a delayed sample to the phase modulator 16 may, for example, be summing amplifier 21. Phase detector 20 is also coupled to voltage-tuned oscillator 15 by means of 90° phase shifter 22 so that the phase of the delayed modulated sample produced at the output of post delay amplifier 19 and the phase of the carrier signal produced by voltage-tuned oscillator 15 may be compared to produce a video output signal. The output of voltage-tuned oscillator 15 is also coupled to one of the input terminals of summing amplifier 21 so that the carrier signal produced by oscillator 15 may be added to the delayed modulated sample of the carrier signal and degeneratively control the cumulative phase change of the sample in a manner which will be fully explained later.

Low-pass filter 23, which is coupled between the output of phase detector 20 and oscillator 15, couples low-frequency components of the video output signal to oscillator 15 to vary the frequency of the carrier signal.

In operation, the integrator must initially be permitted to reach a stabilized operating condition before useful video output information can be obtained. During this initial period, radio-frequency oscillations at, for example, approximately 20 megacycles per second are produced by voltage-tuned oscillator 15. This 20 megacycle carrier signal circulates around the integrator loop through summing amplifier 21, modulator 16, driver amplifier 17, delay line 18, post delay amplifier 19 and phase detector 20. The carrier signal also is continuously recirculated around the loop by coupling the output of amplifier 19 to one input terminal of summing amplifier 21. The 20 megacycle carrier signal produced by oscillator 15 is also passed through 90° phase shifter 22 to phase detector 20. The two inputs to phase detector 20 are compared therein and a voltage output proportional to the phase difference between the two inputs is produced in the well-known manner. The low-frequency components of the output of phase detector 20 are then passed through low-pass filter 23 to voltage-tuned oscillator 15. The frequency of the carrier signal produced by oscillator 15 is corrected by the output of low-pass filter 23 until the carrier signal at the output of oscillator 15 and the sample of the carrier signal which has passed around the integrator loop to the output of post delay amplifier 19 are in phase. Stated in another manner, the frequency or the carrier signal produced by oscillator 15 will be corrected until a number of full cycles of the carrier signal are circulating around the integrator loop and the two inputs to summing amplifier 21 are continuously in phase with each other.

When the integrator has reached this stabilized operating condition, signals may be applied from the radar receiver, source of input signals 14, to phase modulator 16 where the circulating sample of the carrier signal is phase-modulated by the input signals. The phase-modulated sample of the carrier signal is then amplified in driver amplifier 17 to prevent the signal from degrading as a result of attenuation in the various parts of the integrator (particularly delay line 18). The modulated sample is then delayed for a time interval equal to one repetition period of the desired radar signals in quartz delay line 18. The delayed sample is then amplified and limited to a fixed voltage level in post delay amplifier and limiter 19 so as to provide a substantially fixed voltage level input to summing amplifier 21. Postponing for the moment a consideration of the input to summing amplifier 21 which is taken from oscillator 15, summing amplifier 21 serves to return the delayed sample of the carrier signal to phase modulator 16 as the next desired recurring radar signal is received. This latter signal further modulates (changes the phase of) the sample of the carrier signal. Similarly, later successive desired signals cumulatively change the phase of the circulating sample of the carrier signal. The cumulative phase change so produced is detected by phase detector 20 wherein the phase of the modulated carrier signal is compared with that of the unmodulated output of oscillator 15 to produce an enhanced replica of the desired recurring radar signals.

Returning to a consideration of the input to summing amplifier 21 which is taken from oscillator 15, the unmodulated carrier signal is added to the modulated sample of the carrier signal so as to degeneratively control the cumulative phase change of the sample. It is apparent that, if the unmodulated carrier signal is not added to the circulating modulated sample, successive input signals would cumulatively increase the phase deviation of the sample. The resulting phase deviation would continue to increase as the sample circulated through the integrator, and, when no new input signals were received, a constant output signal would be produced by phase detector 20. By combining the unmodulated carrier and the modulated sample of the carrier, the total cumulative increase of phase deviation is limited and the circulating phase deviation is reduced towards zero when no new input signals are received. The manner in which this is accomplished will be explained by referring to FIG. 4.

Figure 4:
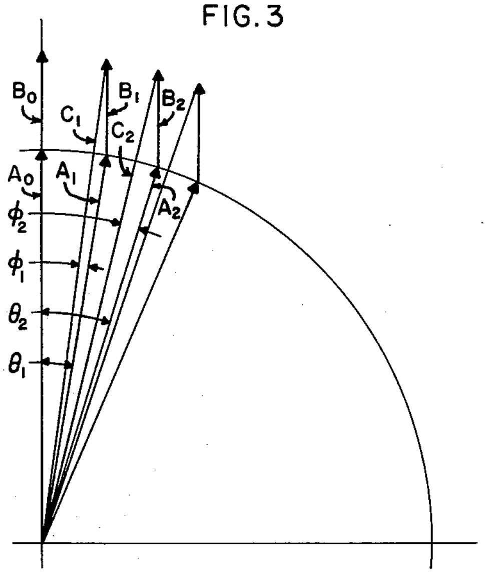
FIG. 4 is a vector diagram which indicates the relationships among several voltages in the integrator of FIG. 3.

In FIG. 4, the circulating sample of the carrier signal at the input of summing amplifier 21 is represented by the vectors $A_0$, $A_1$, $A_2$, etc., the carrier signal produced by oscillator 15 is represented by the vectors $B_0$, $B_1$, $B_2$, etc., and the sum of the two carriers produced at the output of the summing amplifier 21 is represented by the vectors $C_1$, $C_2$, etc. as successive, equal, periodically recurring pulse input signals are applied to the integrator.

Vectors $A_0$ and $B_0$ lying along the vertical axis represent the two inputs to summing amplifier 21 before any recurring input signals are applied to phase modulator 16. When the first pulse input signal is applied to phase modulator 16, the phase of sample $A_0$ is shifted by an angle of $\theta_1°$ and the inputs to summing amplifier 21 are then represented by vectors $A_1$ and $B_1$. The resulting sum of $A_1+B_1$ is $C_1$ which, in turn, is the output of summing amplifier 21. By adding the carrier signal $B_1$ produced by oscillator 15, the phase of the sample $A_1$ is shifted back by an angle $\phi_1$ and the effective modulation of the sample is reduced. The angle $\phi_1$ may be expressed as:

$$\sin^{-1}\left[\frac{G\sin\theta_1}{1+G\cos\theta_1}\right] \qquad (1)$$

where $$G=\frac{B_1}{A_1}$$

and $\theta_1$ is the angle between $A_0$ and $A_1$. If $G<<1$ and $\theta_1$ and $\phi_1$ are small angles, the relationship may be approximated by the expression:

$$\phi_1\approx G\theta_1 \qquad (2)$$

Therefore, when the sample has passed around the loop one time (back to modulator 16), it has been phase shifted.

$$\theta_1-\phi_1=\theta_1-G\theta_1=\theta_1(1-G) \qquad (3)$$

As the sample of the carrier signal represented by the vector $C_1$ is passed around the integrator loop, it too is phase shifted by an angle $\theta_1°$ as it is modulated by the next recurring input signal. Therefore, $C_1$ is shifted to the position shown by vector $A_2$. The amplification, attenuation and limiting which the phase shifted vector $C_1$ undergoes as it passes around the loop produces a signal whose magnitude is equal to that of $A_2$. $A_2$ and $B_2$ are then added in summing amplifier 21 to produce $C_2$. The phase of vector $C_2$ may be expressed as:

$$\theta_2-\phi_2 \qquad (4)$$

where $\phi_2\approx G\theta_2$ and $\theta_2=\theta_1(1-G)+\theta_1$. The phase of vector $C_2$ is, therefore, $$\theta_1(1-G)+\theta_1-G[\theta_1(1-G)+\theta_1]=\theta_1(1-G)+\theta_1(1-G)^2 \qquad (5)$$

This process is repeated as each recurring input signal is received. The phase deviations of the sample appearing at the output of phase detector 20 on successive circulations are therefore:

$$\theta_1,\theta_1+\theta_1(1-G),\theta_1+\theta_1(1-G)+\theta_1(1-G)^2,\ \theta_1+\theta_1(1-G)+\ \ldots\ \theta_1(1-G)^{N-1} \qquad (6)$$

where N is the number of pulses received.

The sum of the phase shifts for N pulses is:

$$\theta_1\left(\frac{1-(1-G)^N}{G}\right) \qquad (7)$$

As N approaches infinity, the sum approaches $\theta_1/G$. It can be seen that the effect of adding the carrier represented by the B vectors becomes more pronounced as the successive input signals are integrated. That is, the angle between corresponding A and C vectors ($\phi_N$) increases as the total phase shift caused by the input signals ($\theta_N$) increases. It is possible and advisable to choose the relative magnitudes of the voltages represented by the A and B vectors and the phase shift caused by input signals such that an equilibrium state is reached when the total phase shift is approximately 45°. This equilibrium state is reached when the phase shift caused by one pulse input signal ($\theta_1$) equals that resulting from adding the carrier signal represented by the B vectors ($\phi_N$). When no input signals are received, the phase deviation $\theta_N$ will decay towards zero on successive circulations as the carrier signal produced by oscillator 15 is added to the circulating sample.

It should be noted that the expression $(1-G)$ is the equivalent of the term $\alpha$ used to describe the operation of the simple idealized integrator which was described earlier. It should also be recognized that an integrator embodying the present invention rejects signals which are random in nature and signals which recur with a repetition period other than that determined by delay line 18. In each of these cases, the phase deviation of the sample produced during one repetition period will not, on the average, be increased during successive repetition periods. In fact, such a phase deviation will decay as the carrier signal produced by oscillator 15 is added to the sample each repetition period.

Figure 5:
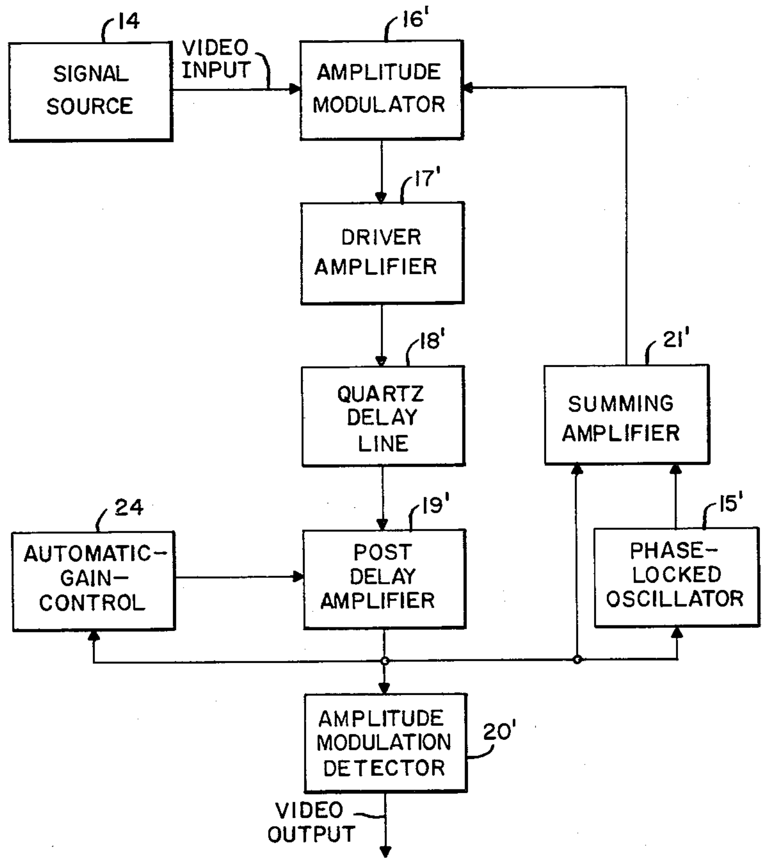
FIG. 5 is a block diagram of an amplitude modulation (AM) integrator embodying the present invention.

Referring now to FIG. 5, components which are functionally similar to components shown in FIG. 4 are designated by the same numeral as the FIG. 4 but are distinguished by the addition of a prime (′) symbol. The system shown in FIG. 5 utilizes amplitude modulation to impress a video signal on a radio-frequency carrier for purposes of integration. The AM integrator comprises signal source 14 which may, for example, be a radar receiver. The integrator further includes a means for supplying a radio-frequency carrier signal such as phase-locked oscillator 15′, a means for varying the amplitude of a sample of the carrier signal, such as amplitude modulator 16′, a driver amplifier 17′ coupled to the output of amplitude modulator 16′ and a quartz delay line 18′ coupled to the output of driver amplifier 17′. The output of delay line 18′ is coupled to post delay amplifier 19′ which, in turn, is coupled to amplitude modulation detector 20′. The output of post delay amplifier 19′ is also coupled to one input terminal of summing amplifier 21′, to automatic-gain-control 24 and to phase locked oscillator 15′. The output of phase-locked oscillator 15′ is coupled to the other of the input terminals of summing amplifier 21′ so that the carrier signal produced by oscillator 15′ may be added to the delayed modulated sample of the carrier signal and degeneratively control the cumulative change of amplitude modulation of the sample in a manner which will be fully explained later.

In operation, the amplitude modulated integrator functions much the same as the previously explained phase modulated integrator. That is, that the radio-frequency oscillations produced by phase-locked oscillator 15′ circulate around the integrator loop through summing amplifier 21′, modulator 16′, driver amplifier 17′, delay line 18′, post delay amplifier 19′, and amplitude modulation detector 20′. The carrier signal also is continuously recirculated around the loop by coupling the output of amplifier 19′ to one input terminal of summing amplifier 21′ which in turn couples the circulating sample of the carrier signal back to modulator 16′. The phase of the oscillations produced by oscillator 15′ is controlled by coupling the output of post delay amplifier 19′ to oscillator 15′ to lock the two signals in phase in the well-known manner. The phases of the two inputs to summing amplifier 21′ are therefore continuously the same. It is also necessary to provide a means for maintaining the output of the post delay amplifier 19′ at a constant amplitude. This is accomplished in a well-known manner by feeding the output of amplifier 19′ to automatic-gain-control 24 which controls the gain of amplifier 19′.

The operation of the amplitude modulated integrator is dependent upon the interaction between the sample of the modulated carrier signal and the output of phase locked oscillator 15′ which are added together in summing amplifier 21′. The modulated sample consists of a carrier signal and the upper and lower amplitude modulation side bands. When the carrier signal generated by oscillator 15′ is added to this modulated sample the resultant carrier is increased in amplitude while the magnitude of the side band information remains constant. The net effect is a reduction in the percentage of modulation. That is, the side bands are decreased in amplitude with respect to the resultant carrier signal. When this resultant modulated carrier signal is passed around the integrator loop, it is amplified, attenuated, and controlled to a fixed voltage level at the output of amplifier 19′. The net effect of adding the carrier signal generated by oscillator 15′ will be to decrease the output of detector 20′. The analogy between the operation of this AM integrator and the previously described PM integrator extends to both the condition where successive input signals are additively combined and to the condition where the circulating information decays when no new input signals are received.

It should be noted that this AM integrator does not suffer the shortcomings of the prior art AM integrators. Feedback ratios close to 1 may be achieved with this configuration since the degeneration is accomplished by using the stable, fixed amplitude oscillator output rather than by combining some of the output video with the input video information.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An integrator for improving the signal-to-noise ratio of periodically recurring signals comprising:
means for supplying an unmodulated carrier signal;
means for causing the recurring signals to periodically modulate said carrier signal so as to produce a cumulatively modulated carrier signal, the cumulative modulation thereof being detectable as an enhanced replica of said recurring signals;
and means for adding said supplied unmodulated carrier signal to the cumulatively modulated carrier signal so as to degeneratively control said cumulative modulation.

2. An integrator for improving the signal-to-noise ratio of periodically recurring signals comprising:

means for supplying an unmodulated carrier signal;
means for causing the recurring signals to periodically modulate said carrier signal so as to produce a cumulatively modulated carrier signal, the cumulative modulation thereof being detectable as an enhanced replica of said recurring signals;
and means for adding said supplied unmodulated carrier signal to the cumulatively modulated carrier signal during each repetition period of said recurring signals so as to limit the cumulative modulation produced by said recurring signals and to reduce the cumulative modulation toward zero when said recurring signals cease.

3. An integrator for improving the signal-to-noise ratio of periodically recurring signals comprising:
means for supplying an unmodulated carrier signal;
means for causing the recurring signals to periodically modulate said carrier signal including means for modulating said carrier signal with said recurring signals, means for delaying the modulated carrier signal so produced for a period equal to the repetition period of said recurring signals, and means for returning the delayed modulated carrier signal to said modulating means as the next recurring signal is received so as to produce a cumulatively modulated carrier signal, the cumulative modulation thereof being detectable as an enhanced replica of said recurring signals;
and means for adding said supplied unmodulated carrier signal to the delayed cumulatively modulated carrier signal so as to degeneratively control said cumulative modulation.

4. An integrator for improving the signal-to-noise ratio of periodically recurring signals according to claim 3 in which the recurring signals are caused to periodically modulate the phase of the supplied unmodulated carrier signal so as to produce cumulative phase modulation of said signal.

5. An integrator for improving the signal-to-noise ratio of periodically recurring signals according to claim 3 in which the recurring signals are caused to periodically modulate the amplitude of the supplied unmodulated carrier signal so as to produce cumulative amplitude modulation of said signal.

6. An integrator for improving the signal-to-noise ratio of periodically recurring signals comprising:
a source of input signals, said input signals including desired radar signals which recur with a substantially fixed repetition period and undesired signals which do not recur with said repetition period;
means for supplying an unmodulated carrier signal;
means for causing the input signals to vary the phase of said carrier signal during each repetition period, including, means for phase modulating said carrier signal with said input signals, means for delaying the modulated carrier signal so produced for a time interval equal to one repetition period, and means for returning the delayed modulated carrier signal to said phase modulating means so that successive desired radar signals produce a cumulatively phase modulated carrier signal, the cumulative phase modulation thereof being detectable as an enhanced replica of said desired radar signals;
and means for adding said supplied unmodulated carrier signal to the delayed cumulatively phase modulated carrier signal so as to degeneratively control said cumulative phase modulation.

7. An integrator for improving the signal-to-noise ratio of periodically recurring signals comprising:
a source of input signals, said input signals including desired radar signals which recur with a substantially fixed repetition period and undesired signals which do not recur with said repetition period;
means for supplying an unmodulated carrier signal;
means for causing the input signals to vary the amplitude of said carrier signal during each repetition period, including means for amplitude modulating said carrier signal with said input signals, means for delaying the modulated carrier signal so produced for a time interval equal to one repetition period, and means for returning the delayed modulated carrier signal to said amplitude modulating means so that successive desired radar signals produce a cumulatively amplitude modulated carrier signal, the cumulative amplitude modulation thereof being detectable as an enhanced replica of said desired radar signals;

and means for adding said supplied unmodulated carrier signal to the delayed cumulatively amplitude modulated carrier signal so as to degeneratively control said amplitude modulation.

8. An integrator for improving the signal-to-noise ratio of periodically recurring signals comprising:

a source of input signals, said input signals including desired signals which recur with a substantially fixed repetition period and undesired signals which do not recur with said repetition period;

means for supplying an unmodulated carrier signal including means for varying the frequency of said signal;

means for causing the input signals to vary the phase of said carrier signal during each repetition period, including means for phase modulating said carrier signal with said input signals, means for delaying the modulated carrier signal so produced for a time interval equal to one repetition period, and means for returning the delayed modulated carrier signal to said phase modulating means so that successive desired signals produce a cumulatively phase modulated carrier signal;

means for detecting the cumulative phase modulation of said cumulatively phase modulated carrier signal to produce an enhanced replica of said desired signals;

means for coupling low frequency components of the output from said means for detecting cumulative phase modulation to said means for varying the frequency of said unmodulated carrier signal;

and means for adding said supplied unmodulated carrier signal to the delayed cumulatively phase modulated carrier signal during each repetition period so as to limit the cumulative phase modulation produced by said desired signals, to reduce said cumulative phase modulation towards zero when said desired signals cease, and to reduce said phase modulation produced by said undesired signals towards zero during each repetition period.

References Cited by the Examiner

UNITED STATES PATENTS

| | | | |
|---|---|---|---|
| 2,736,021 | 2/56 | Sunstein | 328—127 |
| 2,841,704 | 7/58 | Sunstein | 328—127 |
| 3,030,582 | 4/62 | Holcomb et al. | 328—142 |
| 3,092,778 | 6/63 | Siomko | 328—127 |

ARTHUR GAUSS, *Primary Examiner.*

HERMAN K. SAALBACH, GEORGE N. WESTBY, *Examiners.*